United States Patent
Beuchat et al.

(10) Patent No.: US 6,578,148 B1
(45) Date of Patent: Jun. 10, 2003

(54) METHOD AND APPARATUS FOR AN INTEGRATED SECURITY SYSTEM FOR ELECTRONIC COMPONENTS

(75) Inventors: Charles E. Beuchat, Irvine, CA (US); David B. Jones, Pasadena, CA (US)

(73) Assignee: Anchor Pad International, Inc., Cypress, CA (US)

( * ) Notice: Subject to any disclaimer, the term of this patent is extended or adjusted under 35 U.S.C. 154(b) by 0 days.

(21) Appl. No.: 09/275,721

(22) Filed: Mar. 24, 1999

(51) Int. Cl.⁷ .............................. A63F 7/02; G06F 1/16; H05K 7/00
(52) U.S. Cl. ...................................... 713/200
(58) Field of Search ................................ 361/683, 679; 248/553, 500, 551, 680, 503, 506; 368/88, 107; 713/200

(56) References Cited

U.S. PATENT DOCUMENTS

| | | | |
|---|---|---|---|
| 1,801,354 A | | 4/1931 | Lindburg |
| 1,823,753 A | | 9/1931 | Muhlfield |
| 4,585,202 A | * | 4/1986 | Parsekian .................... 248/553 |
| 4,603,829 A | | 8/1986 | Koike et al. ................. 248/553 |
| 4,655,076 A | * | 4/1987 | Weihe et al. ................ 340/602 |
| 4,712,763 A | | 12/1987 | Leitte .......................... 248/553 |
| 5,083,547 A | * | 1/1992 | Davis .......................... 123/527 |
| 5,209,445 A | | 5/1993 | Bergetz ....................... 248/551 |
| 5,228,658 A | | 7/1993 | Kelley ......................... 248/551 |
| 5,335,892 A | | 8/1994 | Busch .......................... 248/551 |
| 5,502,989 A | | 4/1996 | Murray, Jr. et al. ............. 70/58 |
| 6,069,847 A | * | 5/2000 | Wan ............................. 368/88 |

* cited by examiner

Primary Examiner—Ly V. Hua
(74) Attorney, Agent, or Firm—Orrick Herrington & Sutcliffe LLP

(57) ABSTRACT

A security system for electronic devices such as computers that advantageously combines a conventional chassis assembly with an entrapment system that integrally inhibits unauthorized removal of not only the device, but also its internal components. The integrated security system preferably comprises an electronic device having a chassis and a cover attachable to the chassis, a security base plate, a first plurality of locking members attached to the base plate or the chassis, a second plurality of locking members formed in the base plate or the chassis and cover, the second plurality of locking members being adapted to receive and capture a separate one of the first plurality of locking members to secure the device to the base plate and to integrally lock the cover to the chassis while the device remains secured to the base plate, and a lock operably coupled to the device and the base plate to prevent removal of the device from the base plate.

19 Claims, 4 Drawing Sheets

METHOD AND APPARATUS FOR AN INTEGRATED SECURITY SYSTEM FOR ELECTRONIC COMPONENTS

FIELD OF THE INVENTION

This invention relates to security devices for electronic equipment such as computers and, more particularly to a method and apparatus for providing an integrated security system that tends to inhibit theft of the electronic device and its internal components.

BACKGROUND OF THE INVENTION

There are many different electronic type devices that have become targets of theft. Such devices include computers, printers, copiers, video cassette recorders, televisions, and a variety of medical equipment. Due to the vast number of possible situations in which it would be necessary to secure one of these devices against theft, the securing of a computer to inhibit theft will be focussed on for exemplary purposes only.

Over the last twenty years or so, the computer industry has experienced massive growth. The processing power that once required computers that were so large they took up entire floors of office buildings, can now be found in a typical personal computer, i.e., a desktop or laptop computer. These early behemoths were not only large, they were extremely expensive and usually only accessible to a privileged few. Affordability of personal computers has gone hand-in-hand with the increase in processing power. As a result, there has been a significant influx of computers into all forms of business and into educational institutions, from grammar schools to universities. It is now becoming common place for high schools, intermediate schools and even grammar schools to have their own computer laboratories. With the ever-increasing popularity of the internet as a tool for commerce, education and communication, the number of personal computers found in businesses, schools and homes is likely to only increase.

The increase in popularity and desirability of high-powered personal computers has brought with it an increase in theft. Schools and businesses are being burglarized at an alarming rate resulting in the loss of newly installed computers and other electronic devices such as televisions and video cassette players. Well-dressed thieves have been known to brazenly walk into businesses during business hours and walk out with unsecured computer and electronic equipment. In an effort to combat this wide spread problem and inhibit the theft of personal computers and related equipment, computer consumers have employed a variety of devices to secure their computer equipment against theft. One such security system includes the use of a cable attached to the computer and other related components such as the monitor, keyboard, printer, etc., and then attached to a desk, floor or other relatively immovable object. Such a security system, however, tends to be ineffective against a relatively industrious thief and is often aesthetically unpleasant.

Other more secure systems have been developed to inhibit computer theft. An example of such a security system includes the use of a mounting plate secured to a desktop or floor combined with a base plate secured to the bottom of the computer. The base plate includes a number of attachment feet attached thereto which are specifically designed to mate with an equal number of keyhole slots formed in the mounting plate. The attachment feet are adapted to enter the keyhole slots and then be slid to a lockable or non-removable position within the slots. A locking means, such as a lock bar mechanism, is then employed to prevent the attachment feet from being returned to a removable position within the slots and, thus, inhibit the removal of the computer from the mounting plate as a result. Although likely to be more secure and aesthetically pleasing than the cable security system discussed above, the mounting plate security systems also tend to be ineffective against an industrious thief. For instance, the mounting plate system is not likely to prevent a thief from removing the computer cover and taking the largely untraceable internal components found therein such as the central processing unit chip or the memory chips.

To prevent theft of a computer and its internal components, a variety of steel enclosures or entrapments have been designed to encase the entire computer. Although generally effective in preventing theft of the computer and its internal components, such entrapments are so aesthetically unpleasant and inconvenient to use that most computer consumers have opted for other security systems, such as those noted above, or none at all.

Therefore, it would be desirable to have a security system that inhibits unauthorized removal of electronic devices such as computers, as well as the internal hardware and components of the device, and at the same time is both convenient to use and aesthetically pleasing.

SUMMARY OF THE INVENTION

The integrated security system (hereinafter "ISS") of the present invention advantageously combines a conventional chassis assembly of a given electronic device, such as a computer, with an entrapment system that inhibits unauthorized removal of not only the computer, but also its internal components in a manner that is both aesthetically pleasing and convenient to use. With the ISS the typical mounting feet found on a conventional computer chassis or chassis of other electronic devices are replaced with locking feet that mate with a security base plate that has been permanently or selectively removably attached to a desktop, floor or other relatively immovable object. In regard to a computer, the cover is typically designed to slide over the chassis. With the cover in place, the locking feet are installed to retain the cover on the chassis until the locking feet are removed. Next, the computer is attached to the security base plate by inserting the locking feet into a large diameter keyhole portion of keyhole type slots formed in the security base plate and then sliding the computer until the feet encounter the back of a slot portion of the keyhole slots wherein removal of the locking feet is prevented. A locking mechanism is then engaged to lock the computer in place on the security base place, which in turn locks the cover to the chassis. Thus, the computer and its internal components are integrally secured against theft.

Alternatively, the ISS would include locking feet attached to a base plate and keyhole slots formed in a computer chassis and cover. The locking feet mate with the keyhole slots in the computer chassis and cover to lock the computer to the base and lock the cover to the chassis. The cover is slid over the chassis aligning the keyhole slots in both components. With the cover in place, the keyhole slots are aligned with the locking feet mounted on the base plate. Next, the computer is attached to the security base plate by inserting the locking feet into the large diameter keyhole portion of the keyhole type slots and then sliding the computer until the feet encounter the back of the slot portion of the keyhole slots wherein removal of the locking feet is prevented. A locking mechanism is then engaged to lock the computer in place on the security base place, which in turn locks the cover to the chassis. Thus, the computer and its internal components are again integrally secured to inhibit theft.

Accordingly, it is an object of the present invention to provide an improved security system for electronic devices such as computers. Further objects and advantages of the present invention will become apparent from a consideration of the drawings and the following description.

BRIEF DESCRIPTION OF THE DRAWINGS

FIG. 6b is a detail view of a hole and lock bolt assembly of the lock block shown in FIG. 6a.

FIG. 6c is a cross-sectional view taken along line 6c—6c in FIG. 6a.

FIG. 7 is an isometric view of an alternative embodiment of the present invention showing a tower style computer having a retractable dead bolt lock assembly built in.

DESCRIPTION OF THE PREFERRED EMBODIMENT

Figure 1:
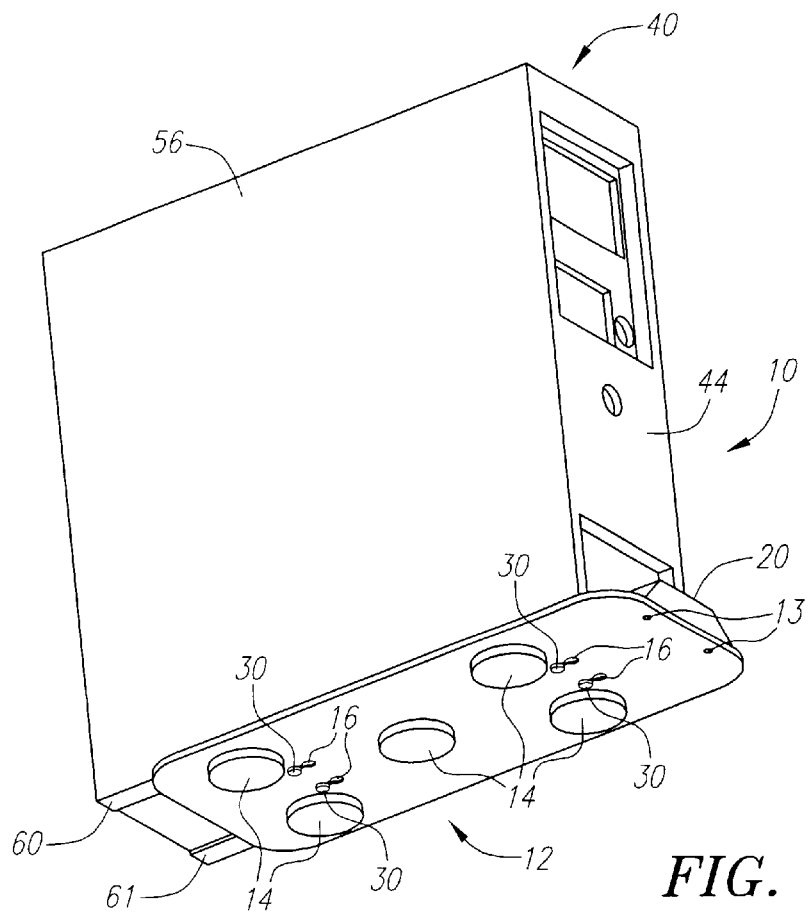
FIG. 1 is an isometric view of an integrated computer security system of the present invention showing a tower style computer, locking feet, an entrapment base plate and a lock block.

Referring now in detail to the drawings, therein illustrated is a novel integrated security system (hereinafter "ISS"). Due to the diversity and vastness of possible applications for the ISS of the present invention, computer related embodiments will be described for exemplary purposes only. These embodiments will focus on an ISS application in which an ISS that is constructed according to the present invention is used to integrally inhibit theft of the computer and its internal components.

Referring to FIGS. 1–6, therein illustrated is a preferred embodiment of the ISS 10 of the present invention. As shown, the ISS 10 of the present invention advantageously combines a conventional computer chassis assembly with an entrapment system that inhibits unauthorized removal of not only the computer, but also its internal components. The locking mechanism of the entrapment system preferably includes operably coupled locking members that integrally secure the computer and its internal components in a manner that is both aesthetically pleasing and convenient to use. In the ISS 10 the typical mounting feet found on a conventional computer are replaced with locking feet that mate with slots formed in a security base plate that has been permanently or selectively removably attached to a desktop, floor or other relatively immovable object. The cover of the computer is designed to slide over the computer chassis. With the cover in place, the locking feet, which may replace the typical locking screws found at the rear of the computer, are installed to secure the cover in place. Next, the computer is attached to the security base plate by inserting the locking feet into the slots formed in the base plate and then sliding the computer until the locking feet encounter the back of the slots. In this position, the locking feet are prevented from being removed from the slots. A locking mechanism is then engaged to lock the computer in place on the security base plate and, as a result, integrally locks the cover in place on the chassis, thereby inhibiting theft of both the computer and its internal components.

The ISS 10 preferably includes a generally rectangular security base plate 12 having a width that is generally slightly wider than the footprint of the computer. The security base plate 12 is fixedly secured to a relatively immovable object such as a floor or wall of a building or a desk with the use of one or more adhesive pads 14. The base plate 12 also includes a plurality of keyhole slots 16 cut through the base plate 12 and aligned in a manner to mate with locking feet 30 that are attached to a computer 40. Although the footprint of the computer 40 may vary slightly from manufacturer to manufacturer, and obviously varies between configurations of the computer, e.g., a desktop, a tower or a notebook, it would be readily apparent to one of ordinary skill in the art that the locations at which the locking feet 30 are mounted to computers could easily be standardized to reduce the number of different sized base plates 12.

Figure 2:
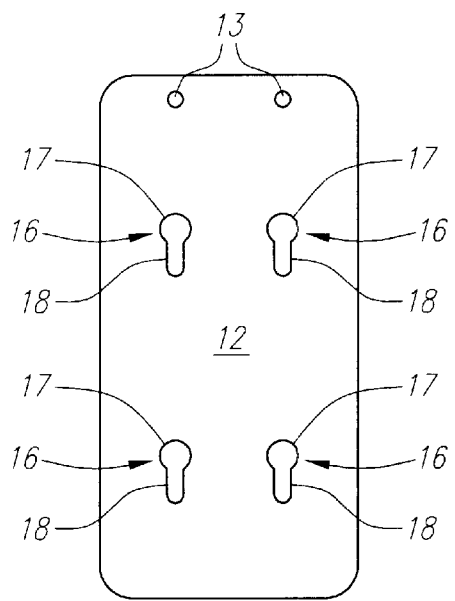
FIG. 2 is a plan view of the entrapment base plate shown in FIG. 1.
Figure 3:
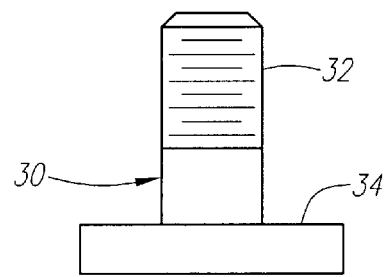
FIG. 3 is a plan view of an individual locking foot shown in FIG. 1.

As shown more clearly in FIG. 2, the keyhole slots 16 each include a larger diameter keyhole portion 17 and a lock slot portion 18, which are adapted to receive and retain an individual locking foot 30 in a locked position relative to the base plate 12. Referring to FIG. 3, each locking foot 30 includes a disc-shaped locking member 34 attached to one end of a screw body 32. The other end of the screw body 32 includes screw threads that are adapted to screw into a screw hole 47 formed in a computer chassis 42. The locking member 34 is sized to be received through the keyhole portions 17 and retained by the lock slot portions 18 of the keyhole slots 16 in the base plate 12. The screw body 32 is sized to enable each locking foot 30 to slide along the lock slot portions 18 of the keyhole slots 16 to a generally locked position or until the locking foot 30 encounters the back of the lock slot 18. In this position, the locking foot 30 is essentially captured by the lock slot portion 18 and can not be removed from the keyhole slot 16 without sliding the locking foot 30 to a position wherein the locking member 34 can be withdrawn through the keyhole portion 17.

Figure 4A:
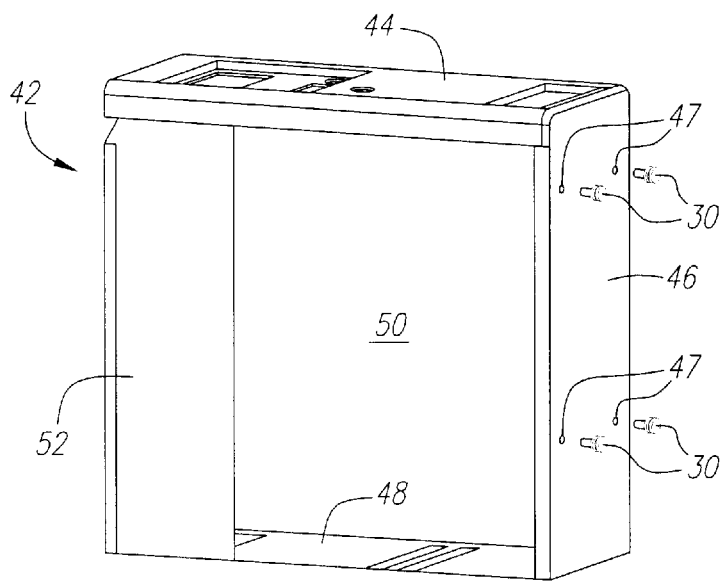
FIGS. 4a and 4b are isometric views of a chassis for a computer having a tower configuration and locking feet of the present invention.
Figure 4B:
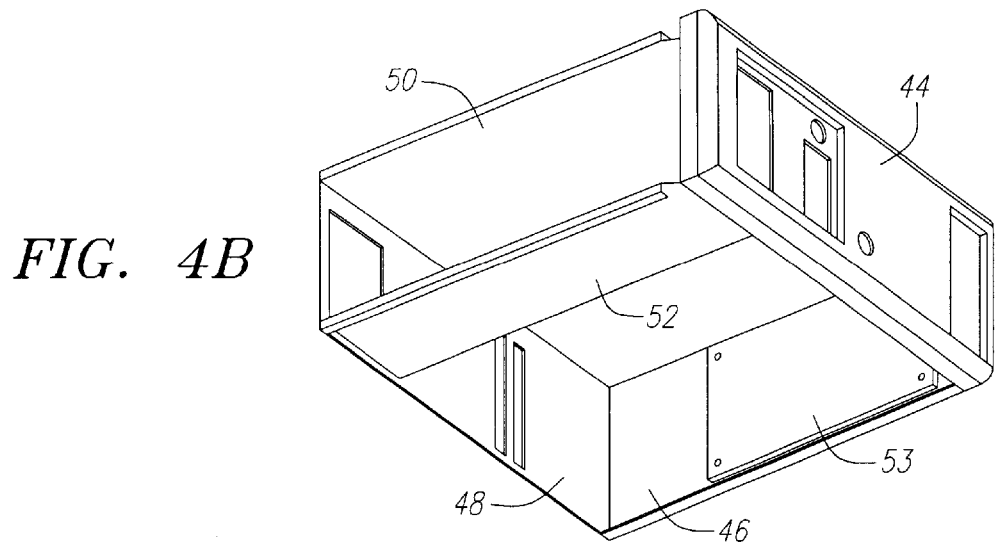

As shown in FIGS. 4a and 4b, the computer 40 of the present invention includes a conventional computer chassis 42. The chassis 42 includes front and rear panels 44 and 48 connected to first and second side panels 50 and 52 and a bottom panel 46. The chassis 42 has been modified only slightly by adding screw-holes 47 through the bottom panel 46, instead of the typical location in the rear panel 48, to attach the cover 54 to the chassis 42.

Figure 5:
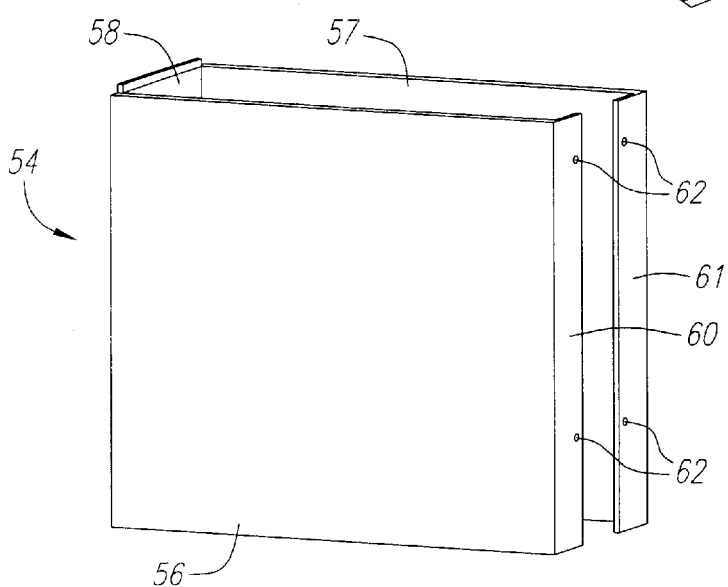
FIG. 5 is an isometric view of a computer cover of the present invention adapted to mate with the computer chassis of FIGS. 4a and 4b.

Referring to FIG. 5, the computer 40 of the present invention also includes a cover 54 having a top panel 58, first and second side panels 56 and 57 attached to the top panel 58, and first and second locking flanges 60 and 61 extending inwardly at a 90° angle from the side panels 56 and 57 at an end opposite the top panel 58. The locking flanges 60 and 61 can be integrally formed with the side panels 56 and 57 of the cover 54 or can be formed as separate components that are then attached to the side panels 56 and 57 by welding or some other means. Each of the first and second locking flanges 60 and 61 include a plurality of through-holes 62, which align with the screw-holes 47 formed in the bottom panel 46 of the chassis 42. With the screw and through holes 47 and 62 aligned, the screw body 32 of each locking foot 30 is able to pass through the through holes 62 and screw into the screw-holes 47 to attach the cover 54 to the chassis 42.

In operation, the cover 54 is placed over the chassis 42, with the locking feet 30 removed, such that the through holes 62 in the locking flanges 60 and 61 are aligned with the screw holes 47 in the bottom panel 46 of the chassis 42. Once aligned, the screw-body 32 of each locking foot 30 is screwed into the screw-holes 47 attaching the cover 54 to the chassis 42. With the cover 54 secured to the chassis 42, the locking feet 30 are aligned with the keyhole slots 16 in the base plate 12. The locking member 34 of each locking foot 30 is passed through the keyhole portions 17 of the keyhole slots 16. The computer 40 is then moved to a substantially locked position by sliding the locking feet 30 within the lock slot portions 18 of each keyhole slot 16 until the locking feet 30 encounter the back of the lock slot portions 18. In this position, the locking feet 30 are retained by the lock slot portions 18 and cannot be removed from the keyhole slots 16 without sliding the computer 40 back to a position wherein the locking member 34 can pass through the keyhole portion 17 of the keyhole slots 16. With the locking feet 30 in a locked positioned, a lock block 20 is attached to the base plate 12 to lock the computer 40 in place on the base plate 12. The lock block 20 is mounted on the base plate 12 adjacent the base of the front panel 44 of the chassis 42 and generally abuts the front panel 44 of the chassis 42. The lock block 20 prevents the computer from sliding forward to a position wherein the locking member 34 of each locking foot 30 can be removed by being passed through the keyhole portion 17 of the keyhole slots 16. By locking the computer 40 to the base plate 12, the cover 54 is locked onto the chassis 42 and cannot be removed until the computer 40 is removed from the base plate 12. Thus, the ISS 10 of the present invention integrally inhibits unauthorized removal of both the computer 40 and its internal components.

Figure 6A:
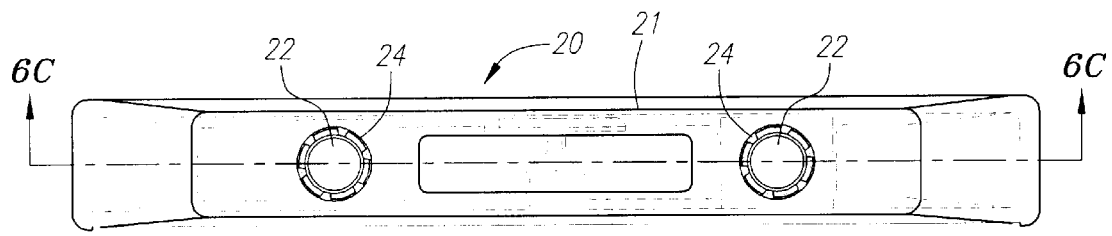
FIG. 6a is a top view of the lock block shown in FIG. 1.
Figure 6B:
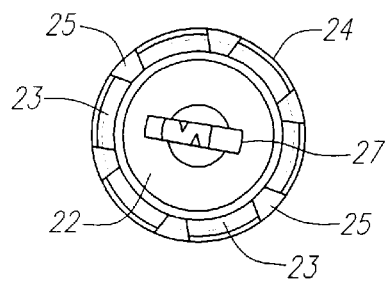
Figure 6C:
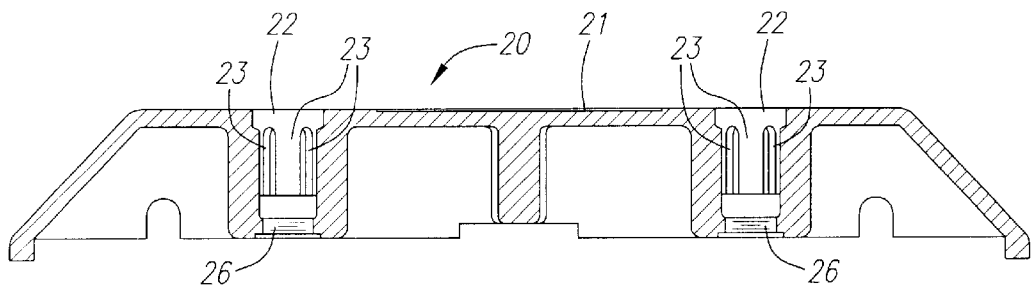

The lock block 20 as shown if FIGS. 6a, 6b and 6c, comprises a generally rectangular body 21 with a wedge-shaped profile having a pair of holes 24 formed therein. A pair of lock bolts 22 pass through the holes 24, and secure the lock block 20 to the base plate 12. Each of the holes 24 includes a plurality of elongated protuberances 25 extending along the wall of the holes 24. Each of the lock bolts 22 includes a threaded portion 26 adapted to screw into a pair of threaded holes 13 formed in the base plate 12. The lock bolts 22 also include a plurality of elongated outwardly biased columns 23 extending along a substantial length of the bolts 22. When the bolts 22 are inserted in the holes 24 of the lock block 20, the columns 23 tend to abut the protuberances 25 in a manner that prevents rotation of the lock bolts 22. A key member (not shown) may be inserted in a keyway 27 to engage the columns 23. As the key member is fully inserted it engages the columns 23 and draws them inwardly to a position disengaged from the protuberances 25. With the columns 23 disengaged, the lock bolts 22 are able to rotate within the holes 24 and screw into the threaded holes 13 formed in the base plate 12. Once in place, the key member is removed so the lock bolts 22 cannot be rotated and the lock block 20 remains locked in place on the base plate 12.

Figure 7:
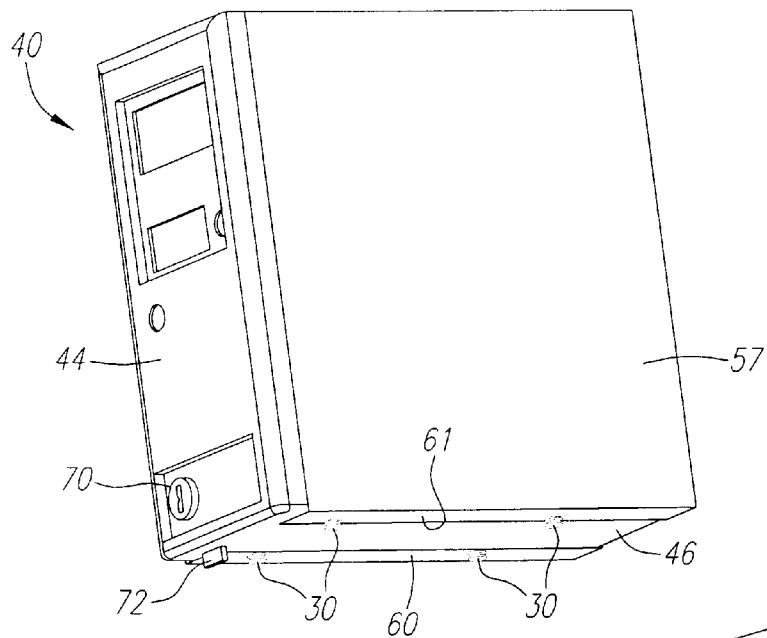

In an alternative embodiment shown in FIG. 7, the lock block 20 is replaced by a dead bolt assembly 70 mounted in one of the panels of the computer chassis 42. The dead bolt assembly 70 is preferably manually operated and mounted in the front panel 44 of the chassis 42. Alternatively, the dead bolt assembly 70 is electronically driven by a solenoid that is controlled by computer software. The solenoid is activated via a secure method such as entering a personal code into the computer.

The dead bolt assembly 70 includes a retractable dead bolt 72 that is moveable between a locked position wherein it extends beyond the base of the front panel 44 and an unlocked position wherein it retracts within the front panel 44. In this embodiment, the base plate 12 is modified to include a recess (not shown) that receives the dead bolt 72 in a locked position and thereby locks the computer 40 in place on the base plate 12 and, thus, integrally secures both the computer 40 and its internal components from unauthorized removal. Alternatively the ISS 10 could include a locking device internal to the computer 40, such as a key activated locking cam, that could rotate into a mating apparatus on the base plate 12 and prevent forward motion of the computer 40 relative to the base plate 12.

Figure 8:
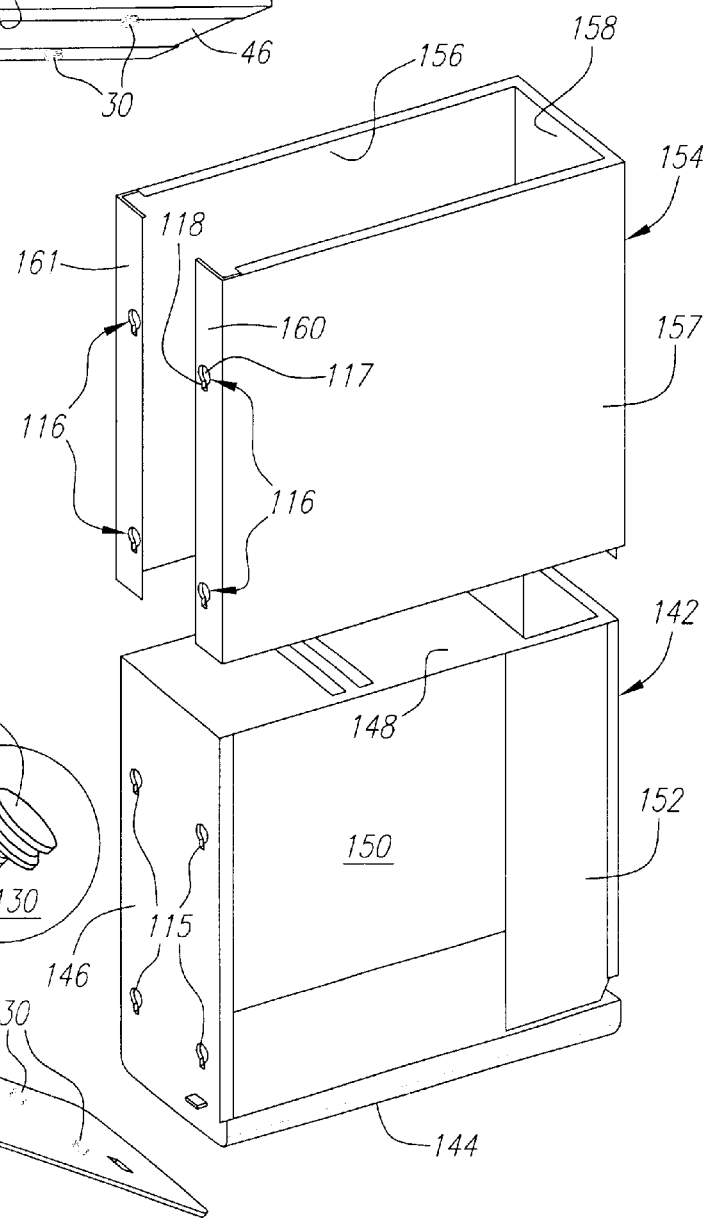
FIG. 8 is an isometric view of another alternative embodiment of the present invention.

FIG. 8 shows another alternative embodiment of the present invention in which the locking feet of the previous embodiments are attached to the base plate and mate with slots formed in the computer chassis and cover. The ISS 110 of this embodiment also includes a generally rectangular security base plate. 112 having a width that is generally slightly wider than the footprint of the computer. As shown, a plurality of locking feet 130 are attached to the base plate 112. Each locking foot 130 includes a disc-shaped locking member 134 attached to one end of a screw body 132. A disk shaped retainer member 133 is formed on the screw body 132 closely adjacent to the locking member 134 with a small gap formed there between. The other end of the screw body 132 includes screw threads that are adapted to screw into a screw hole 147 formed in the base plate 112. The locking member 134 is sized to be received through keyhole slots formed in the computer chassis and cover, and spaced from the retainer member 133 a sufficient distance to capture the cover and chassis therebetween.

The computer 140 of this embodiment includes a conventional computer chassis 142. The chassis 142 includes front and rear panels 144 and 148 connected to first and second side panels 150 and 152 and a bottom panel 146. The chassis 142 has been modified slightly by adding keyhole slots 115 through the bottom panel 146. The computer 140 also includes a cover 154 having a top panel 158, first and second side panels 156 and 157 attached to the top panel 113, and first and second locking flanges 160 and 161 extending inwardly at a 90° angle from the side panels 156 and 157 at an end opposite the top panel 158. The locking flanges 160 and 161 can be integrally formed with the side panels 156 and 157 of the cover 154 or can be formed as separate components that are then attached to the side panels 156 and 157 by welding or some other means. Each of the first and second locking flanges 160 and 161 include a plurality of keyhole slots 116, which align with the keyhole slots 115 formed in the bottom panel 146 of the chassis 142. With the keyhole slots aligned, the locking member 134 of each locking foot 130 is able to pass through the keyhole slots 115 and 116 of the chassis 142 and cover 154 to secure the cover 154 to the chassis 142. The keyhole slots 115 and 116 each include a larger diameter keyhole portion 117 and a lock slot portion 118, which are adapted to receive and retain an individual locking foot 130 in a locked position. Each locking foot 130 is sized such that its locking member 134 is received by the keyhole portions 117 and retained by the lock slot portions 118 of the keyhole slots 115 and 116 in the chassis 142 and cover 154. The screw body 132 is sized to enable each locking foot 130 to slide along the lock slot portions 118 of the keyhole slots 115 and 116 to a generally locked position or until the locking foot 130 encounters the back of the lock slot 118. The retainer 133 is positioned at a sufficient distance from the locking member 134 to create a gap there between of sufficient size to capture the chassis 142 and cover 154 therein and limit the distance the locking member 134 extends into the chassis. In this position, the locking foot 130 is essentially captured by the lock slot portion 118 and can not be removed from the keyhole slots 115 and 116 without sliding the computer to a position wherein the locking member 134 of each locking foot 130 can be withdrawn through the keyhole portion 117 of the keyhole slots 115 and 116.

In operation, the cover 154 is slid over the chassis 142, such that the keyhole slots 115 in the locking flanges 160 and 161 are aligned with the keyhole slots 116 in the bottom panel 146 of the chassis 142. Next, the keyhole slots 115 and 116 of the chassis 142 and cover 154 are aligned with the locking feet 130 on the base plate 112. The locking member 134 of each locking foot 130 is passed through the keyhole portions 117 of the keyhole slots 115 and 116. The computer 140 is then moved to a substantially locked position by sliding it along the base plate 112 while it is guided by the locking feet 130 positioned within the keyhole slots 115 and 116. The computer 140 will travel along the base plate 112 until the screw body 132 of the locking feet 130 encounter the back of the lock slot portions 118. In this position, the locking feet 130 are retained by the lock slot portions 118 and the computer 140 cannot be removed from the base plate 112 without moving the computer 140 such that the locking member 134 of each locking foot 130 is in a position wherein the locking member 134 can pass through the keyhole portion 117 of the keyhole slots 115 and 116. With the locking feet 130 in a locked positioned, a locking device 120, such as a dead bolt assembly, is activated to lock the computer 140 in place on the base plate 112. The dead bolt assembly 120 prevents the computer 140 from sliding forward to a position wherein the locking member 134 of each looking foot 130 can be passed through the keyhole portion 117 of the keyhole slots 115 and 116. By locking the computer 140 to the base plate 112, the cover 154 is locked onto the chassis 142 and cannot be removed until the computer 140 is removed from the base plate 112. Thus, the ISS 110 of this embodiment integrally inhibits unauthorized removal of both the computer 140 and its internal components.

In another alternative embodiment, a steel security plate 53 may be attached to the bottom panel 46 of the chassis 42 as shown in FIG. 4b. Preferably, the security plate 53 will include a hole that may be accessed through a hole or slot (not shown) in the chassis 42, or cover 54, to allow a cable to be attached to the plate 53. The cable could then be attached to any peripheral hardware component by use of a standard type mounting node attached to the component. Alternatively, the security plate 53 and cable assembly could be used to attach the computer to any relatively non-movable object if the user elects not to use the base plate 12 of the ISS 10.

Other configurations of the ISS 10 have also been envisioned. It would be reasonable to configure the cover 54 and chassis 42 assembly such that the locking feet 30 could extend from the side or top of the computer 40 and mate with a vertically oriented base plate 12. This configuration could prove useful when it is desirous to install the computer 40 under a desk and secure it to a vertical surface of the desk. Alternatively, the ISS 10 could be configured such that the locking feet 30 would not mate with a base plate, but instead would mate with the surface of a desk, the floor or another similar computer workstation that has had keyhole slots formed therein similar to the base plate 12 described above. A suitable locking mechanism could be used to prevent removal of the locking feet from the keyhole slots.

Hence, the integrated security system of the present invention provides many benefits over the prior art. While the above description contains many specifics, these should not be construed as limitations on the scope of the invention, but rather as examples of particular embodiments thereof. Many other variations are possible. Accordingly, the scope of the present invention should be determined not by the embodiments described herein, but by the appended claims and their legal equivalents.

What is claimed:

1. An integrated security system for an electronic device comprising
    an electronic device having a chassis and a cover attachable to said chassis, and
    a locking mechanism comprising a plurality of locking feet adapted to slidably secure said cover to said chassis, wherein said locking mechanism is adapted to integrally secure said device to an object and said cover to said chassis, and wherein said cover remains locked on said chassis while said device is secured to said object.

2. The integrated security system of claim 1 wherein said locking feet are lockingly captured in a wall of said object.

3. The integrated security system of claim 1 wherein said locking mechanism further comprises a base plate adapted to lockingly capture said locking feet and secure said device to said base plate.

4. The integrated security system of claim 3 wherein said base plate comprises a plurality of locking members adapted to receive and retain said locking feet.

5. The integrated security system of claim 4 wherein each of said plurality of locking members comprises a slot.

6. The integrated security system of claim 3 wherein said locking mechanism further comprises a locking member adapted to prevent removal of said device from said base plate.

7. The integrated security system of claim 1 wherein said locking feet are adapted to attach said cover to said chassis, and wherein said locking mechanism comprises first and second locking members, said first member being adapted to receive and retain said locking feet to secure said device to said object and prevent removal of said cover when said device is secured to said object, and said second member being adapted to prevent removal of said locking feet from said first member.

8. The integrated security system of claim 1 wherein said locking mechanism includes a plurality of slots formed in said cover and said chassis, said slots being adapted to receive and retain said locking feet.

9. A computer security system comprising
    a computer having a computer chassis and a computer cover attachable to said chassis,
    a security base plate,
    a plurality of locking feet attached to said computer chassis or said base plate,
    a plurality of locking members formed in said base or said chassis and cover, each of said plurality of locking members lockingly capturing a separate one of said plurality of locking feet to secure said computer to said base plate and said cover to said chassis, and a lock operably coupled to said computer and said base plate to prevent removal of said computer from said base plate.

10. The computer security system of claim 9 wherein said lock comprises a lock block that attaches to said base plate and abuts said computer.

11. The computer security system of claim 9 wherein said lock comprises a dead bolt assembly housed in said chassis and having a retractable dead bolt, said base plate having a recess formed therein, said dead bolt being received in said recess when in an extended position to prevent removal of said computer from said base plate.

12. The computer security system of claim 9 wherein each of said plurality of locking members comprises a keyhole slot.

13. The computer security system of claim 9 wherein said cover comprises first and second locking flanges.

14. The computer security system of claim 13 wherein said first and second locking flanges comprises a plurality of through holes and wherein said chassis comprises a plurality of screw holes configured to align with said plurality of through holes, each of said plurality of locking feet passing through one of said plurality of through holes and being screwed into one of said plurality of screw holes to attach said cover to said chassis.

15. The computer security system of claim 13 wherein said first and second locking flanges comprises first and second cover slots, said chassis including first and second chassis slots formed therein, said first and second cover slots being alignable with said first and second chassis slots, and each of said first and second cover slots and first and second chassis slots being adapted to receive and retain a locking member.

16. A method for securing an electronic device and its internal components against theft, comprising the steps of
providing a electronic device having a chassis and a cover attachable to said chassis, and
providing first and second plurality of locking members operably coupled to said object and said chassis, and
slidably capturing said first plurality of locking members with said second plurality of locking members to secure said device to said object and integrally lock said cover on said chassis.

17. The method of claim 16 wherein one of the pluralities of locking members are locking feet.

18. The method of claim 16 further comprising the step of locking said device in place relative to said object.

19. A securable electronic device comprising
a chassis having first and second slots,
a cover attachable to said chassis, said cover having first and second slots alignable with said first and second slots of said chassis, said first and second slots of said cover and said chassis being adapted to slidably receive and retain a locking member extending from an object to secure said cover to said chassis and to secure said cover and chassis to said object.

\* \* \* \* \*